July 7, 1970          G. E. LONG ET AL          3,519,770
SWITCHING APPARATUS FOR SERVO SYSTEM
Filed July 19, 1968          2 Sheets-Sheet 1
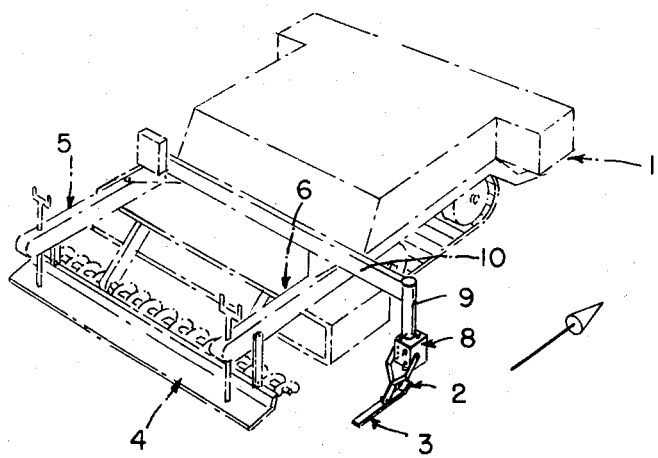
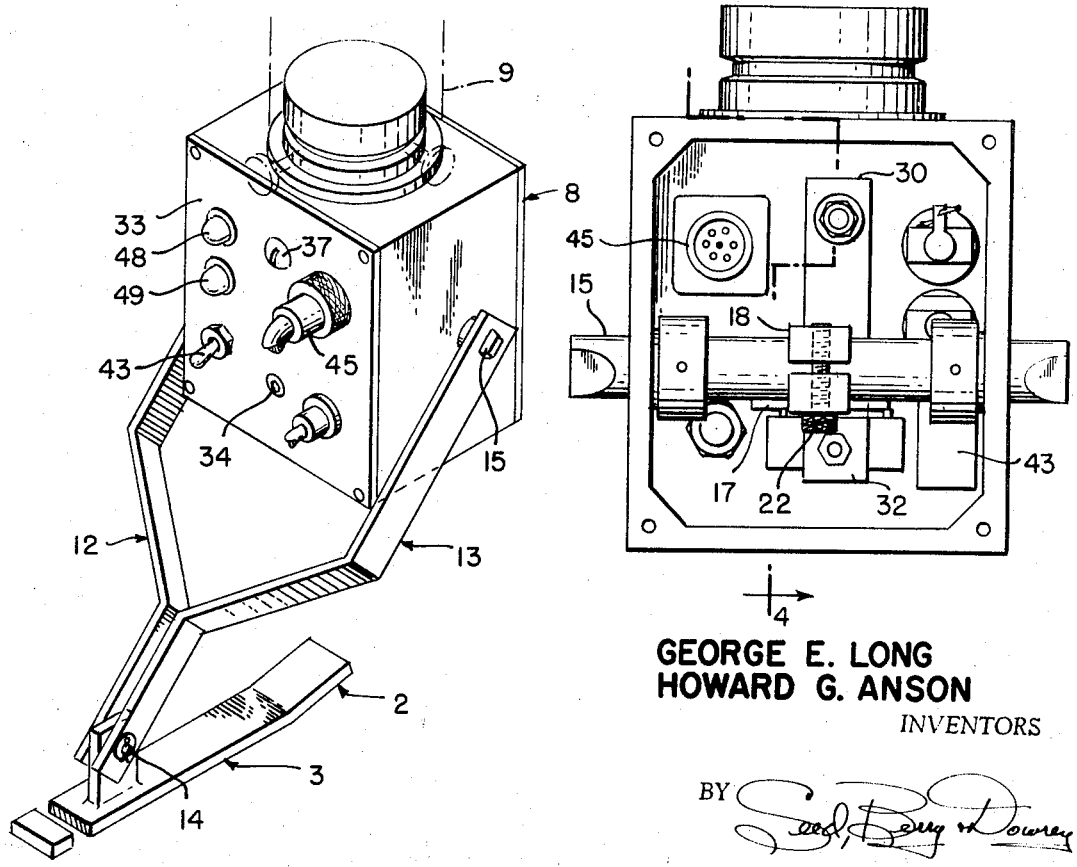
GEORGE E. LONG
HOWARD G. ANSON
INVENTORS
ATTORNEYS July 7, 1970   G. E. LONG ET AL   3,519,770
SWITCHING APPARATUS FOR SERVO SYSTEM
Filed July 19, 1968   2 Sheets-Sheet 2
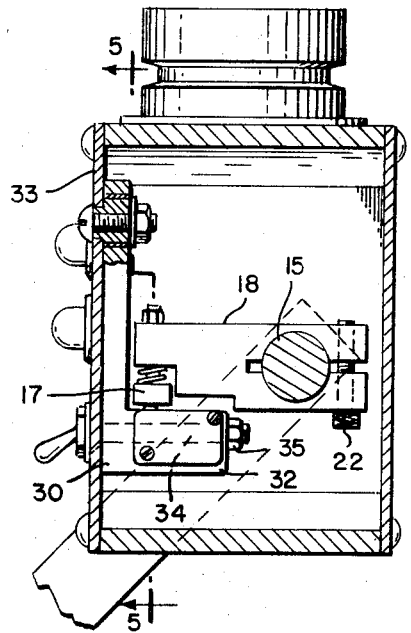
FIG__4
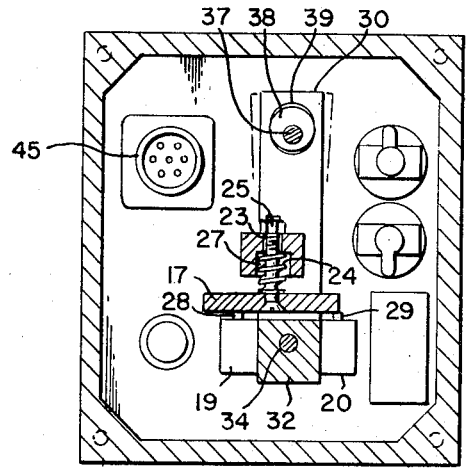
FIG__5
FIG__7
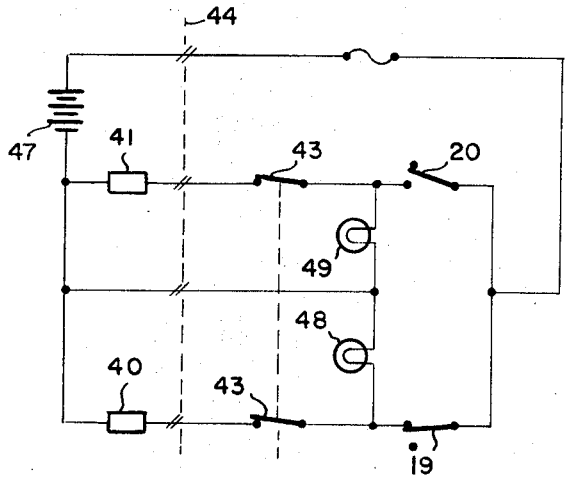
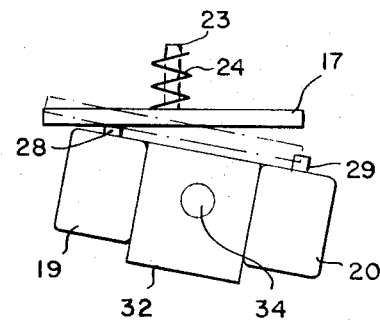
FIG__6
GEORGE E. LONG
HOWARD G. ANSON
      INVENTORS
BY
            ATTORNEYS

United States Patent Office 3,519,770
Patented July 7, 1970

3,519,770
SWITCHING APPARATUS FOR SERVO SYSTEM
George E. Long, Rte. 2, P.O. Box 382, Monroe, Wash. 98272, and Howard G. Anson, 15823 35th NE., Seattle, Wash. 98105
Filed July 19, 1968, Ser. No. 746,159
Int. Cl. H01h 3/16
U.S. Cl. 200—61.42                    6 Claims

ABSTRACT OF THE DISCLOSURE

Switching apparatus for servo systems wherein a single operator activates separate switches. The actuator is resiliently mounted on an operating arm and the switches are mounted on an angularly adjustable mounting for controlling the amount of displacement of the opertor required to throw the respective switches thereby providing a controllable dead band between the actuation of the switches.

BACKGROUND OF THE INVENTION

The present invention relates generally to switching apparatus for performing the function of a summation point or null point in an electrical-mechanical servo system. More specifically, the present invention relates to rugged switching apparatus for servo systems employed with construction machinery for sensing a preset datum or other reference level and aligning a surface to some predetermined relation with the datum level.

A specific example of construction machinery for which the present invention is intended is paving machines. In these machines, servo systems may be employed to sense the elevation of an existing roadway and to raise or lower a paving screed so as to match the elevation or grade of the new roadway with the existing one. The operation of matching the two surfaces is referred to as "joint matching."

The physical environment in which construction machinery is employed dictates rugged construction for the servo system apparatus since the machinery is subjected to vibrations and transient shocks of large magnitude and often of prolonged duration. The servo system must therefore be capable of performing reliably under these conditions.

The switching apparatus cooperates with the servo system by originating electrical command signals for raising and lowering the screed. To simplify the control system and hence increase reliability, the screed is raised and lowered at substantially constant rates. The command signals are generated at two switch positions to which the switching apparatus is thrown depending upon whether the screed is too high or too low. In order to provide for a range wherein no correction is needed and the screed is considered to be on grade, a dead band or null zone is created by a third switch condition at which neither command signal is generated. The width of the dead band establishes the sensitivity of the system and the tolerances of the joint matching operation.

It is accordingly an object of the present invention to provide an improved servo mechanism of the character described. The improvement contemplated relates to three position switching apparatus suitable for incorporation in a servo system employed with construction machinery. The center position of the switching apparatus may be varied to control the sensitivity of the system. The simplicity of construction and operation of the switching apparatus allows relatively few components to be employed enabling them to be ruggedly constructed and increasing system reliability.

Another object is to provide a three position switching of the character described which is capable of being constructed from inexpensive commercially available two position switches and which is rugged, fully enclosed, with the center position adjustment means being accessible from the outside. A still further object is to provide an improved and simplified apparatus for adjusting the physical location of two switches relative to a single switch actuator to allow non-simultaneous throwing of the switches between normal and non-normal switch positions by the single actuator.

DESCRIPTION OF THE DRAWINGS

Other objects and features of the present invention will be apparent from the following description of the invention and from the accompanying drawings wherein:

FIG. 1 is a perspective view of a typical paving machine and a joint matching servo system;

FIG. 2 is an enlarged perspective view of the skid and switching unit of the present invention;

FIG. 3 is an elevational view of the switching unit with the rear cover plate removed;

FIG. 4 is a cross-sectional view taken along line 4—4 of FIG. 3;

FIG. 5 is a cross-sectional view taken along line 5—5 of FIG. 4;

FIG. 6 is a schematic illustrating the operation of the spring loaded actuator and tilt table; and FIG. 7 is a schematic of the electrical circuit employed with the servo system and switching apparatus.

DESCRIPTION OF THE INVENTION

The present invention is switching apparatus for an electrical-mechanical servo system such as may be employed in a paving machine. The invention, however, is in no way limited to construction machinery but is applicable in its broadest form to servo systems employed in other environments and even to other diverse switching needs. The paving machine servo system is designed to maintain a screed at some predetermined position relative to a reference of datum level. The screed may be thought of as a flat blade or platform which establishes the elevation of the newly laid surface. The screed may be raised and lowered by hydraulic or other conventional lift means in response to electrical up and down command signals generated by the servo system. A grade sensing device is used to determine whether the screed is too high or too low and is coupled to the present switching apparatus for generating the proper command signal to maintain screed alignment.

The reference or datum level to which the screed is matched may be an existing roadway or other pavement. In this case, the grade sensor may be a skid carried on a pivotally mounted sensing arm supported from the paving machine. The skid, sometimes referred to as a "ski," slides on the existing pavement near an edge or shoulder to which the new surface is to be matched. The skid rises and falls relative to the screed as the machine negotiates the random contours of the roadbed over which the new surface is laid. At some particular elevation of the screed relative to the skid, the machine will lay down a new pavement surface which matches the existing surface.

When the machine in its travel encounters a depression in the subgrade, the screed falls relative to the skid. The physical displacement of the skid is used to throw the switching apparatus to a first throw position. In the case described, the switching apparatus activates an electrical circuit which generates a signal which causes energization of the screed adjusting means so as to raise the screed to restore the initial relative skid and screed positioning. As the machine recovers from the roadbed depression, the screed rises relative to the skid. This relative movement throws the switching apparatus to a second position and a down command signal is generated to cause lowering of the screed to again restore the initial relative skid and and screed positioning. As long as the initial relative positioning of the skid and screed is maintained, the switching apparatus is thrown to a third or center position at which neither command signal is generated.

According to the present invention, the center position of the switching apparatus is variable in width. This means that the skid displacement required to throw the switch from the center position to either the first or second throw positions can be varied. The ability to vary the width of the center position enables the tolerances and sensitivity of the servo system to be adjusted to meet the diverse demands.

The switching apparatus is comprised of two switches, an actuator bar and tilt means. The three throw position action of the switching apparatus is obtained by throwing the switches between two of their switch positions at different displacements of the skid. Both switches are thrown by the actuator bar which is controlled by movement of the skid. The tilt means includes a table which is pivotally mounted to vary the location of the switches relative to the actuator bar thereby causing the switches to be thrown by the bar at different skid displacements.

Referring to FIG. 1, the paving machine moves in the direction indicated by the arrow so as to tow the skid 3 having an upturned toe 2. The screed 4 is connected to the draft arms 5 and 6 and is raised and lowered by means such as hydraulic rams (not shown) associated with the arms 5 and 6 in any conventional manner known in the art. The screed establishes the grade and transverse slope of the paving material spread by the machine. In a typical system raising and lowering of the screed may be controlled by a 4-way, 3-position, hydraulic spool valve. Such valves are spring centered and neither raise nor lower the screed when in the centered position. The valve has two solenoids which shift the valve spool to its two outer positions from the central position so as to either raise or lower the screed depending upon which solenoid is actuated. The present switching apparatus controls the actuation of these solenoids as will presently be explained in detail.

The switching apparatus of the present invention is enclosed in housing 8. The housing is rigidly connected to the draft arms 5 and 6, and therefore the screed 4, by post 9 and beam 10. It will be understood that the post 9 is vertically adjustable relative to the beam 10 by conventional means such as a screw jack (not shown). FIG. 2 illustrates the manner in which skid or ski 3 is suspended from the paving machine. The arms or struts 12 and 13 connect skid 3 to housing 8. The skid is pivotally connected to the struts by appropriate fasteners at pivot point 14 allowing the skid to lie generally flat on the existing surface. The struts are rigidly connected to shaft 15 which is suitably journaled for rotation in housing 8.

Referring now to FIGS. 3 and 4, the function of shaft 15 is to translate the raising and falling motion of the skid into rotary motion for operating the actuator bar 17. When the paving machine rides over a depression in the subgrade, skid 3 rises relative to housing 8 rotating shaft 15 clockwise as viewed in FIG. 4. When the paving machine rides over a hump in the subgrade, skid 3 falls relative to housing 8 rotating shaft 15 counterclockwise.

The vice-like arm 18 carries the actuator bar and is rigidly clamped to shaft 15. The clamping action of the arm 18, however, provides a safety factor in that excess forces applied to the skid 3 will result in slippage between the arm and shaft 15. Repositioning of the arm 18 on the shaft 15 would, of course, be necessary following any such slippage. Actuator bar 17 throws the movable contacts on switches 19 and 20 between their normal and non-normal switch positions when shaft 15 rotates clockwise and counter-clockwise. Arm 18 is locked at a preset angular position to shaft 15 by lock screw 22. The angular relation of the arm 18 to shaft 15 determines the desired elevation of the screed relative to the skid. The desired angular relation for the matching operation is established generally by vertically adjusting the unit by means of the screw jack of post 9 as previously mentioned. In this manner the switching apparatus is set so as to be thrown to the center or null position when the screed is paving at the proper elevation.

Actuator bar 17 is spring mounted on arm 18 by post screw 23 and coil spring 24 as best illustrated in FIG. 5. The hole in arm 18 through which screw 23 extends has an enlarged diameter which permits angular movement of the screw within the hole and a nut 25 secures the screw 23 in position on the arm 18. The enlarged diameter hole seats the upper end of spring 24, the lower end of which seats on actuator bar 17. The described mounting allows shaft 15 to continue counter-clockwise rotation (for example) after one end of the bar has encountered resistance. With continued counter-clockwise rotation of the bar, the bar tends to slip and to rotate about the point of resistance. This action causes first one switch 19 or 20 to be thrown then the other as bar 17 rotates. The switches are thrown by depressing and releasing the switch buttons 28 and 29.

The switches 19 and 20 are supported by L-shaped base 30 as illustrated in FIGS. 3, 4 and 5. Referring to FIG. 5, the leg 32 on base 30 constitutes a table to which the switches 19 and 20 are rigidly secured. The table 32 is pivotally mounted to the front plate 33 of housing 8 by pivot bolt 34 which has a nut 35. The table may be rotated clockwise or counter-clockwise about the pivot 34 to raise and lower the position of the switches 19 and 20 relative to actuator bar 17. This adjustment of the position of the switches permits the width of the switching apparatus center position to be varied. Pivoting of table 32 is accomplished by the screw 37 and eccentric cam 38 fixed thereto. The screw 37 is accessible on front plate 33 of housing 8, thus permitting the switches to be adjusted without opening the housing. Turning screw 37 clockwise or counter-clockwise causes cam 38 to rotate about the axis of 37, its eccentric point, exerting a force on the walls of groove 39 cut in the vertical portion of base 30, thereby rotating the table. Using an eccentric cam and positioning it at a distance from pivot 34, provides a "fine" adjust for establishing the angular position of table 32. A quarter-turn of screw 37 results in a much smaller fractional turn of table 32 about pivot member 34.

Switches 19 and 20 are commercially available two position switches, spring loaded to maintain the movable switch arm in a normal position. The movable switch arms are coupled to buttons 28 and 29. When the buttons are depressed by actuator bar 17, the switches are thrown to their non-normal positions.

FIG. 6 illustrates how the three position switch action is obtained from the two position switches 19 and 20. The angle between the plane of table 32 and actuator bar 17 is greatly exaggerated to aid in the explanation. The solid lines indicate the location of bar 17 just prior to depressing switch button 28 and the dashed lines indicate the location of bar 17 when both buttons 28 and 29 are depressed. Because switch 19 is closer to bar 17 than switch 20, the following switch action occurs when bar 17 is displaced between the two locations indicated in FIG. 6. Button 28 is depressed and button 29 remains in its normal position as the bar moves generally downward to a position short of contacting button 29. Further downward motion of the bar depresses button 29 thereby maintaining both buttons 28 and 29 depressed. As the bar moves upward, first button 29 is released to its normal spring held position with button 28 remaining depressed. When bar 17 returns generally to the location indicated by the solid lines in FIG. 6, button 28 is also released to its normal spring held position. The switching apparatus three throw positions are: the first position when neither button 28 or 29 is depressed—this indicates that the screed is below its desired level relative to the skid and must be raised; the center position when only one button is depressed—this indicates that the screed is at the desired position or elevation relative to the skid; and the second position when both buttons 28 and 29 are depressed—this indicates that the screed is above its desired level relative to the skid and must be lowered.

The width of the center position, i.e., the amount of displacement allowed the skid before a switch is actuated, is varied by pivoting table 32 about pivot member 34. This increases or decreases the total distance through which the skid must move to cause the bar 17 to move between the boundaries of the center position, i.e. neither button depressed to both buttons depressed. The width of the center position establishes the sensitivity of the servo system to variations of the screed elevation above or below that desired. The center position provides a summation point or null point within which small elevation errors are ignored.

FIG. 7 is a schematic of the electrical circuit in which the switching apparatus is employed. As previously pointed out, the purpose of the servo system is to actuate the solenoids on the hydraulic valve controlling the raising and lowering of the screed. The valve solenoids are represented by blocks 40 and 41. Solenoid 40 operates the valve to cause the screed to rise and solenoid 41 operates the valve to cause the screed to lower. Toggle switch 43 is an on-off switch. The components to the right of dashed line 44 are physically contained in housing 8 and are electrically coupled to the components to the left of line 44 via electrical connector 45 (FIGS. 2, 3, and 5). These components include the valve solenoids and battery 47 which are located elsewhere on the paving machine. Lamps 48 and 49 are energized to indicate to an operator whether the screed is being raised or lowered.

The switches 19 and 20 are shown in the normal spring loaded or biased positions, i.e. the first switch position with buttons 28 and 29 are not depressed. In this case, switch 19 couples battery 47 across solenoid 40 and lamp 48 thereby generating the up command signal causing the screed to be raised. In the center switch position, button 28 is depressed thereby opening switch 19. In this case, both switches are open with the result that battery 47 is not connected across either solenoid. In the second switching apparatus position, i.e. both buttons 28 and 29 depressed, switch 19 is open and switch 20 is closed connecting battery 47 across solenoid 41 and lamp 49 thereby generating the down command signal causing the screed to be lowered.

From the foregoing it will be readily apparent to those skilled in the art that the present invention provides significant improvements in switching apparatus of the character described for servo systems and for general applications. It is understood that the structural components described may be subjected to numerous modifications and variations well within the purview of this invention and applicants' intend to be limited only to a liberal interpretation of the specification and appended claims.

The embodiments of the invention in which an exclusive property or privilege is claimed are defined as follows:

1. In combination with an electrical-mechanical servo system of the type wherein adjustable platform means is maintained in a predetermined position relative to a datum level by apparatus including means for raising and lowering the platform means in response to electrical up and down command signals and sensing means for sensing the elevation of the platform means relative to the datum level, switching apparatus comprising;
   first and second switch means operatively coupled to said servo system for generating in cooperation therewith said up and down command signals,
   an actuator bar operatively coupled to said sensing means and disposed to throw said switch means between normal and non-normal switch positions in response to movement of the platform means relative to the datum level and tiltable mounting means mechanically coupled to said first and second switch means, whereby the location of said first and second switch means relative to said bar is selectively variable causing one switch means to be thrown prior to the other to provide a center position in which the platform means is held substantially stationary relative to the datum level.

2. The apparatus of claim 1 wherein said switch means are biased to a normal throw position and are coupled to said servo system to generate said up command signal while in said normal throw position and to generate said down command signal while in a non-normal throw position.

3. The apparatus of claim 1 wherein said mounting means comprises a pivotally mounted table for carrying said switch means and adjustment means for rotating said table about its pivot point.

4. The apparatus of claim 1 wherein said switch means comprises two position switches spring loaded to a normal throw position, said first and second switch means connected to said servo system such as to generate said up and down signals while in normal and non-normal throw positions respectively, said tiltable mounting means comprising a pivotally mounted table, and eccentric cam means coupled to said table for rotating the table, said switch means being disposed adjacent a spring mounted actuator bar coupled for movement with said sensing means.

5. Variable center position switching apparatus comprising:
   actuator means including a member having a switch contacting side,
   first and second switches mounted to face the switch contacting side of said member,
   said actuator means being disposed to throw said switches in response to physical displacement of a sensor, and
   tilt means coupled to said switches to vary the location of at least one switch relative to said actuator means causing one switch to be thrown prior to the other providing said switching apparatus with a variable center position.

6. In combination with a paving machine servo system of the type wherein a screed is maintained in a predetermined position relative to a datum level by apparatus including means raising and lowering the screed in response to electrical up and down command signals and a skid for sensing the position of the screed relative to the datum level, switching apparatus comprising;
   first and second switches each having a normal and a non-normal position and a movable arm spring biased to maintain each switch in its normal position, said switches being electrically connected to said servo system for generating said up command signal when both switches are in their normal position and for generating said down command signal when both switches are in their non-normal positions,
   an actuator bar coupled to said skid for movement thereby, said actuator bar being spring mounted and disposed relative to said switches for operating said movable arms to move the switches between their normal and non-normal positions,
   a pivotally mounted base means having an extension for carrying said switches and a groove for receiving a cam, and an eccentric cam means mounted in the groove of said base means to cause rotation of said switches relative to said actuator bar upon rotation of said cam, whereby the amount of relative movement of said actuator bar necessary to move both said switches may be varied.

References Cited

UNITED STATES PATENTS

| 2,441,532 | 5/1948 | Millikin et al. | 94—46 |
| 2,540,444 | 2/1961 | Harland. | |
| 3,264,959 | 8/1966 | Shea | 94—46 |
| 3,334,560 | 8/1967 | Long et al. | 94—46 |

ROBERT K. SCHAEFER, Primary Examiner

M. GINSBURG, Assistant Examiner

U.S. Cl. X.R.

94—46